United States Patent [19]
Bennett

[11] Patent Number: 5,446,466
[45] Date of Patent: Aug. 29, 1995

[54] RADIO BEACON PHASE MODULATOR

[75] Inventor: Steven J. Bennett, Coquitlam, Canada

[73] Assignee: MPR Teltech Ltd., British Columbia, Canada

[21] Appl. No.: 59,577

[22] Filed: May 12, 1993

[51] Int. Cl.$^6$ ............ G01S 1/00; G01S 1/08; H03H 9/00; H04L 27/10
[52] U.S. Cl. .................. 342/385; 342/386; 375/280; 332/144
[58] Field of Search ......... 342/385, 386; 332/144, 332/103, 104; 375/67, 53

[56] References Cited

U.S. PATENT DOCUMENTS 3,935,386  1/1976  Glasson et al. ............ 375/53
4,179,672  12/1979  Voles ...................... 332/103

Primary Examiner—Gregory C. Issing
Attorney, Agent, or Firm—Myers, Liniak & Berenato

[57] ABSTRACT

A phase modulator for a position indicating radio beacon which includes a digital memory circuit having a plurality of sets of stored numerical amplitude values with each set corresponding to a sine wave of a given phase and with at least three values in each set. A selection circuit selects phase values from the memory circuit in steps between a predetermined angular range in response to input data and, for each phase value, transfers the set of amplitude values in series at spaced apart time intervals to a digital to analog converter. A high frequency filter has an input coupled to an output of the digital to analog converter such that a sine wave is produced at an output of the high frequency filter.

12 Claims, 2 Drawing Sheets

RADIO BEACON PHASE MODULATOR

BACKGROUND

The present invention relates to a phase modulator for a radio beacon which produces a specific phase modulation required for such an application.

The conventional approach to produce phase modulation in position indicating radio beacon (PIRB) devices which send signals to search and rescue satellite aided tracking (SARSAT) satellites orbiting around the earth is to perform analog phase modulation. The requirement is for phase modulation between the phase angles of +1.1, 0 and −1.1 radians. The data must cause the carrier to dwell for specific intervals at each phase angle and also to transition smoothly and progressively between the primary phase angles at a defined rate. This is a difficult requirement to meet using analog phase modulation circuits. Such methods are difficult to reproduce in manufacturing and need careful tuning and periodic re-tuning to counteract ageing. They are also sensitive to temperature variations.

Accordingly, it is an object of the invention to provide an improved phase modulator for a position indicating radio beacon (PIRB). It is a further object to provide such a phase modulator which requires no tuning or re-adjustment. Yet another object of the invention is to provide a phase modulator for a PIRB which is smaller than conventional ones.

SUMMARY OF THE INVENTION

According to the invention there is provided a phase modulator for a position indicating radio beacon which includes a digital memory circuit having a plurality of sets of stored numerical amplitude values with each set corresponding to a sine wave of a given phase and stored numerical amplitude values in each set. Means are provided for selecting amplitude values for each of a plurality of successive phase values from the memory circuit in steps from a last primary phase value corresponding to a last input data value to a next primary phase value corresponding to a next input data value and transferring the set of amplitude values for each phase value in series at spaced apart time intervals to a digital to analog converter. A high frequency filter has an input coupled to an output of the digital to analog converter such that a phase modulated sine wave is produced at an output of the high frequency filter.

Preferably the selecting means includes a phase sample selector coupled to the memory for selecting a set of amplitude values at each phase angle. A timing and sequence generating circuit coupled to an input of the phase sample selector provides selection commands. The selection commands are formed by the timing and sequence generating circuit which has an input coupled to an input data line and forms its commands in response to input data. The phase sample selector extracts and transfers amplitude memory values for each phase to a register. A high speed selector coupled to the register is operative to extract in sequence numerical amplitude values from the register and transfer them to the digital to analog converter.

The primary phase angles which establish the angular range of the phase values may advantageously be −1.1, 0 and +1.1 radians. The amplitude values stored in the register are selected by a high speed selector circuit every ⅓ of a cycle of the output from the filter. Preferably, there are at least six phase steps between the primary phase angle values.

In another aspect of the invention there is provided a method of modulating a sinusoidal wave with input data which includes storing a number of sets of amplitude values in digital memory with each set corresponding to a sine wave with a given phase angle, in response to input data, extracting and storing each set of amplitude values for sets corresponding to phase angles in steps between two of the values −1.1, 0 and +1.1 radians, and directing the extracted values for each set to a digital-to-analog converter to produce an analog output. Filtering of the analog output from the digital-to-analog converter produces a sine wave output.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
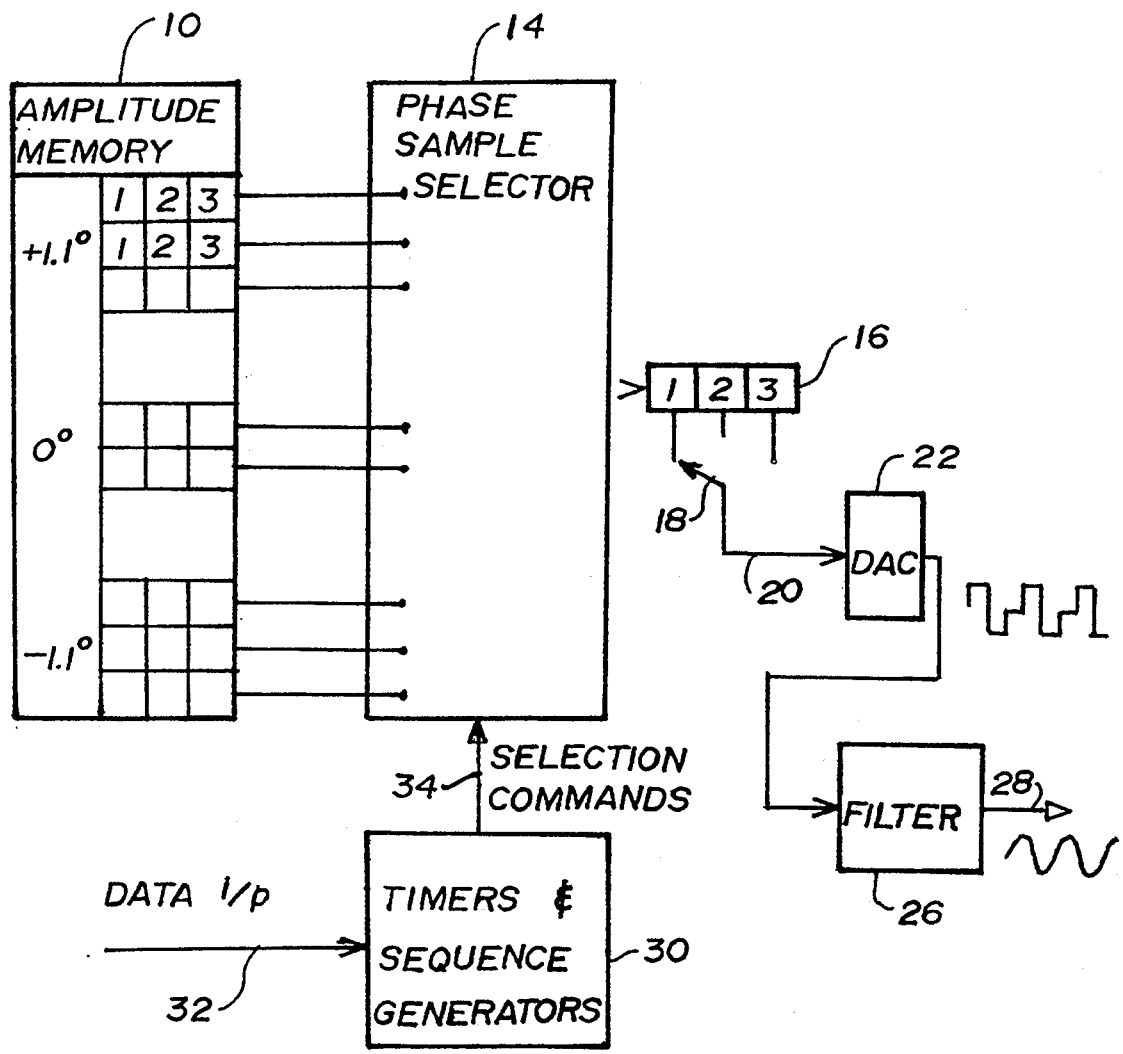
FIG. 1 is a schematic diagram of the circuit for the modulator.

Referring to FIG. 1 there is shown the modulator circuitry which includes a non-volatile digital memory 10 such as a PROM memory circuit in which are stored three amplitude values in each location. The three amplitude values representing three points on a sinusoidal wave are all that is required to completely define the wave. Since the phase change requirement is the range between the values of −1.1, 0 and +1.1 radians there are nine numerical values required for the latter-mentioned three positions and three times the number of intermediate phase steps between the foregoing three primary phase angle positions. Testing has shown that only six more steps were needed to provide sufficiently smooth transitions between the primary states leading to a total memory requirement of 27 values. Each memory value is represented by 8 bits of data.

Memory values are selected by a phase sample selector 14 and transmitted to a register 16 in response to selection commands from line 34. The selection commands are generated by a set of timing and sequence generating circuit 30 in accordance with digital data received on line 32.

The sample values stored temporarily in register 16 are accessed by high speed selector circuit 18, in turn, every ⅓ of a cycle of the output frequency (10 MHz) and directed along line 20 to a digital to analog converter (DAC) 22. Thus, the sample values in register 16 are accessed by a 30 MHz clock (not shown). DAC 22 generates an analog output on line 24 which is then filtered by filter 26 to produce a smooth sinusoidal output on line 28 at a frequency of about 10 MHz. The latter signal is mixed with a higher frequency signal outside the PIRB chip to produce the transmitted signal.

The precise phase modulation is produced by changing the three samples to others which represent sine waves with the same frequency but different phase. The transition from one phase to another is made smooth by having a sufficiently large number of small steps stored in memory and by stopping at each one for a short interval before moving to the next. When a transition is required, counting circuits (not shown) step in succession through the sets of three samples representing intermediate phases stopping at each one briefly and ultimately reaching the 0, +1.1 or −1.1 radian set of samples.

Figure 2:
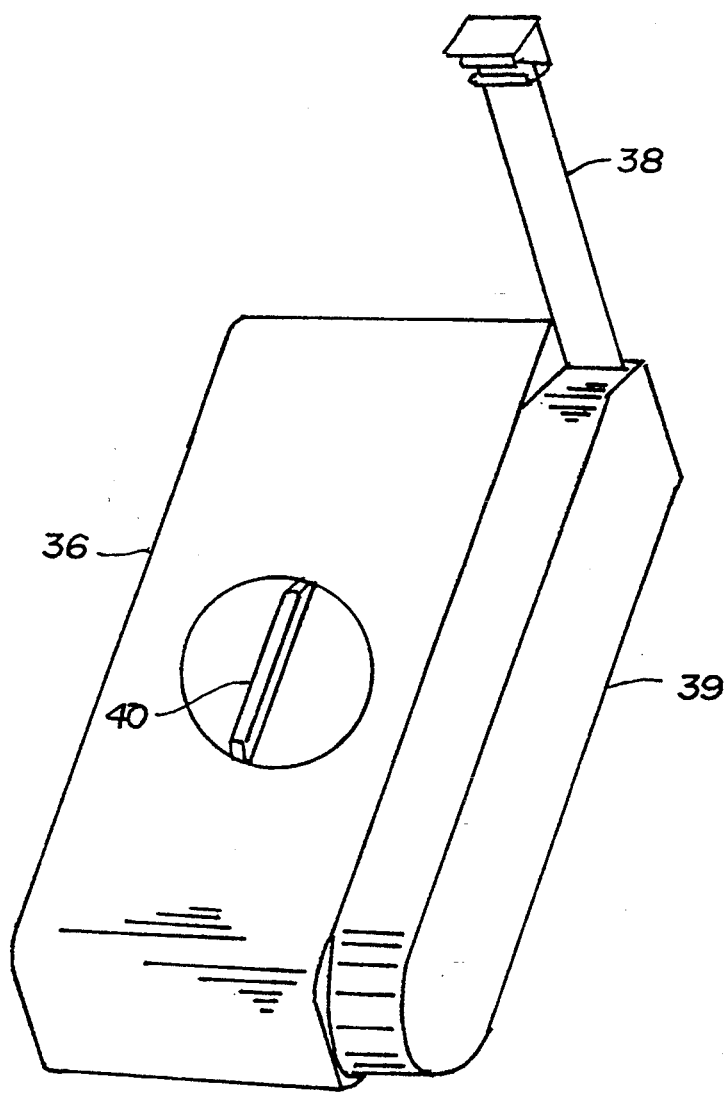
FIG. 2 is a perspective view of a position indicating radio beacon (PIRB) into which the modulator is incorporated.

FIG. 2 shows a small position indicating radio beacon 36 in which the circuitry of FIG. 1 is incorporated. The beacon 36 includes a roll up antenna 38 housed in an antenna housing 39 and a switch 40 to control the functioning of the beacon 36.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall with the true scope of the invention.

I claim:

1. A phase modulator for a position indicating radio beacon, comprising:
   (a) a digital memory circuit having a plurality of sets of stored numerical amplitude values with each set corresponding to a sine wave of a given phase and having three stored numerical amplitude values in each set;
   (b) a digital to analog converter;
   (c) means for selecting amplitude values for each of a plurality of successive phase values from said memory circuit in steps from a last primary phase value corresponding to a last input data value to a next primary phase value corresponding to a subsequent input data value and, for each phase value, transferring the set of amplitude values in series at spaced apart time intervals to said digital to analog converter; and
   (d) a high frequency filter having an input coupled to an output of said analog-to-digital converter such that a phased modulated sine wave is produced at an output of said high frequency filter.

2. A phase modulator according to claim 1, wherein said selecting means includes:
   (a) a phase sample selector coupled to said memory;
   (b) a timing and sequence generating circuit coupled to said phase sample selector and having an input coupled to an input data line;
   (c) a register coupled to an output of said phase sample selector, wherein said phase sample selector is operative to transfer numerical amplitude values stored in said memory for each phase to said register, and
   (d) a high speed selector circuit coupled to said register and operative to extract, in sequence, numerical amplitude values from said register and transfer them to said digital-to-analog converter.

3. A phase modulator according to claim 1, wherein said primary phase angles are −1.1, 0 and +1.1 radians.

4. A phase modulator according to claim 2, wherein the amplitude values stored in said register are selected by the high speed selector circuit every $\frac{1}{3}$ of a cycle of the output from said filter.

5. A phase modulator according to claim 4, wherein the output frequency is 10 MHz.

6. A phase modulator according to claim 1, wherein said primary phase angles are −1.1, 0 and +1.1 radians and there are at least six phase steps between said primary phase angles.

7. A method of modulating a sinusoidal wave with input data, comprising:
   (a) storing a number of sets of amplitude values in digital memory with each set corresponding to a sine wave segment having a given phase angle for primary phase angles of −1.1, 0, and +1.1 radians and for a plurality of angles between the primary phase angles;
   (b) extracting successive sets of amplitude values from a last primary phase angle extracted to a next primary phase angle corresponding to the input data and interpolative sets of values in between said last and next primary values;
   (c) converting the digital values for each set to an analog output waveform; and
   (d) filtering the analog output to produce a phase modulated sine wave.

8. A method according to claim 7, wherein said storing step includes storing at least 6 sets of values in succession between the primary phase angles of −1.1, 0 and +1.1 radians.

9. A method according to claim 7, wherein said extracting step includes converting the input data to a selection command address for corresponding amplitude values stored in the digital memory.

10. A method according to claim 7, wherein the frequency of the analog output is 10 MHz and the digital data is converted to analog data at a rate of 30 MHz.

11. A method according to claim 7, including converting the input data to selection commands to direct selection of the stored amplitude values.

12. A method according to claim 7, wherein said converting step is done by a digital-to-analog converter.

* * * * *